July 3, 1962 A. H. HUMPHREY ETAL 3,042,072
DIAPHRAGM TYPE VALVE STRUCTURE
Filed Feb. 18, 1959
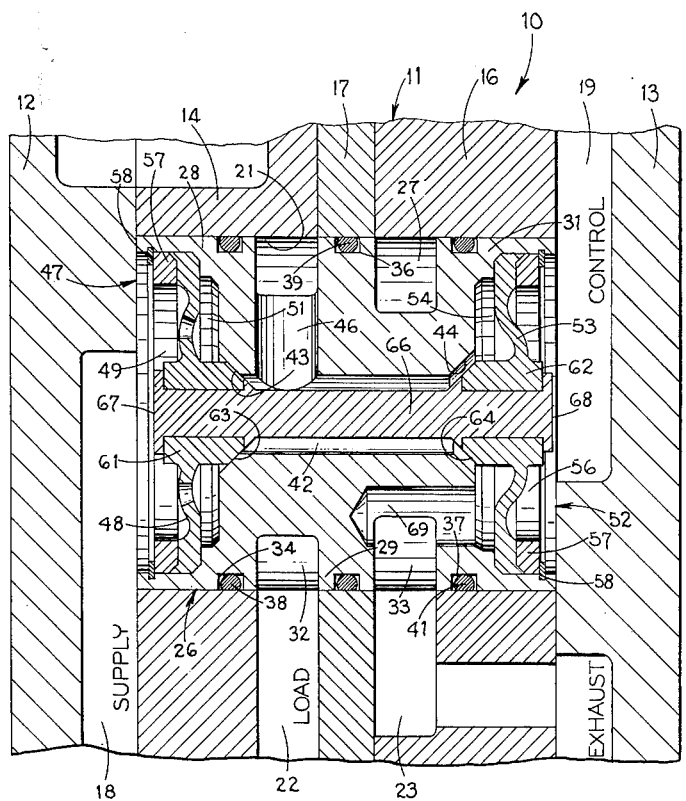
INVENTORS
ALFRED H. HUMPHREY
STANLEY M. LOVELESS
BY
*Woodhams Blanchard and Flynn*
ATTORNEYS United States Patent Office 3,042,072
Patented July 3, 1962

3,042,072
DIAPHRAGM TYPE VALVE STRUCTURE
Alfred H. Humphrey, Kalamazoo, and Stanley M. Loveless, Oshtemo Township, Kalamazoo County, Mich., assignors to General Gas Light Company, Kalamazoo, Mich., a corporation of Michigan
Filed Feb. 18, 1959, Ser. No. 794,060
1 Claim. (Cl. 137—454.6)

This invention relates to a valve construction and, more particularly, relates to a diaphragm-type valve construction which may be placed in position merely by sliding the valve into an appropriate opening in a block or a casing and wherein the ports of the valve need not be precisely aligned with the conduits in the block or casing. This application is an improvement in the structure disclosed in application Serial No. 654,174, now Patent No. 2,912,009, granted Nov. 10, 1959, which is assigned to the assignee of the present invention.

While the valve construction disclosed in the aforementioned application has been found to be effective and reliable in operation, in a constant effort to increase the utility and effectiveness thereof, it has been observed that it is not particularly well suited for use in situations where the ports of the valve are not to be connected to pipes, hoses or the like but must be placed in communication with drilled or bored conduits in a block. For example, in many situations it is necessary or desirable to insert a valve unit into an opening in a block or casing having conduits formed therein so that the ports of the valve will be in registry with the appropriate conduits in the block or casing. It is desirable that such inserting be accomplished by a mere sliding movement and that it also be as easily and readily removable. The prior valve construction could not easily be used for this purpose.

Further, the prior valve construction utilized springs, solenoids and the like for shifting the operating parts of the valve and there are many situations where the use of such valve shifting devices is not necessary, desirable or practical. In particular, in situations where the valves are placed within a large casing or block, it is frequently difficult, if not impossible, to provide any special valve shifting mechanisms of the aforementioned types therefor. Therefore, it is desirable to provide a valve construction in which the valve is insertable into an opening in a block or casing and includes all the necessary structural elements for effecting operation and shifting thereof.

Accordingly, it is an object of the invention to provide an improved diaphragm-type valve especially adapted for being placed in a block or casing having conduits therein and which does not need to be carefully aligned in the block or casing in order to obtain a proper registry of the ports thereof with the appropriate conduits.

It is a further object of the invention to provide an improved diaphragm-type valve, as aforesaid, which may be inserted into or removed from the block or casing by a sliding movement.

It is a further object of the invention to provide an improved diaphragm-type valve, as aforesaid, which is operated or shifted by fluid pressure and the operating or shifting pressure fluid is isolated from the pressure fluid being controlled by the valve.

It is a further object of the invention to provide an improved diaphragm-type valve, as aforesaid, which does not utilize springs or solenoids for effecting shifting thereof but relies solely upon fluid pressure for effecting shifting thereof between its positions.

It is a further object of this invention to provide an improved diaphragm-type valve, as aforesaid, which consists of a relatively few, simple, rugged parts and which, therefore, is inexpensive to manufacture, reliable in operation and requires little maintenance.

Other objects and advantages of the invention will become apparent to those acquainted with apparatus of this type upon reading the following description and inspecting the accompanying drawing which is a central sectional view through the valve and showing the valve mounted within a suitable block or casing.

Referring to the drawing, the valve assembly 10 includes a valve casing or block 11 which is herein shown as consisting of a pair of end plates 12 and 13, a pair of intermediate plates 14 and 16, and a center plate 17. The end plates 12 and 13 have conduits 18 and 19 formed therein in any suitable manner, such as by machining. The conduits 18 and 19 are adapted to carry pressure fluid and, in this particular embodiment of the invention, conduit 18 carries the pressure fluid whose flow is to be controlled by the valve while conduit 19 carries the pressure fluid for effecting shifting of the valve. Thus, conduit 18 supplies the working pressure fluid and is sometimes hereinafter referred to as the inlet conduit. Conduit 19, which is sometimes hereinafter referred to as the control conduit, is adapted to supply pulses of operating pressure fluid from a suitable source, such as further valving (not shown) to the valve assembly for causing the valve to shift into one or the other of its operation positions. The intermediate plates 14 and 16 and the center plate 17 define a central opening 21 which extends between the end plates 12 and 13 and which communicates at its ends with the conduits 18 and 19. The intermediate plates 14 and 16 are formed to provide a passage 22 and a passage 23. The passages 22 and 23 communicate with the central opening 21 through the side wall thereof at axially spaced points therealong.

The valve 26 includes a generally cylindrical housing 27 having three axially spaced, circular flanges 28, 29 and 31 extending radially outwardly therefrom. The flanges 28, 29 and 31 define two axially spaced, annular grooves 32 and 33 which are radially aligned with and communicate with the passages 22 and 23, respectively. The flanges 28, 29 and 31 have annular recesses 34, 36 and 37, respectively, in the periphery thereof and said recesses have O-rings 38, 39 and 41 disposed therein. The O-rings 38, 39 and 41 sealingly contact the wall of the central opening 21 of the casing 11 and serve to isolate the grooves 32 and 33 from each other and from the ends of said central opening to prevent flow of pressure fluid therebetween around the periphery of the valve 26.

The housing 27 has a longitudinally extending, coaxial, central passageway 42 having oppositely facing conical valve seats 43 and 44 at the ends thereof. A radially extending passage 46 connects the central passageway 42 with the groove 32.

A generally cylindrical enlarged chamber 47 is provided at one end of the housing, the leftward end as shown in the figure. A perforate, flexible diaphragm 48 extends across the chamber 47 and divides it into two smaller chambers 49 and 51 which are in communication with each other through the perforations in the diaphragm. A corresponding, generally cylindrical chamber 52 is provided at the other end of the housing 27, that is, the rightward end in the figure. An imperforate, flexible diaphragm 53 extends across the chamber 52 and divides it into two chambers 54 and 56 which are isolated from each other by said diaphragm. The diaphragms 48 and 53 are secured to the housing by the retaining rings 57 which are held in position by snap rings 58. An axially extending passage 69 connects the chamber 54 to the groove 33.

The diaphragms 48 and 53 have enlarged central hubs 61 and 62, respectively, which have conical valve faces 63 and 64 thereon facing the valve seats 43 and 44, respectively, and being capable of sealing engagement therewith. A valve stem 66 is secured to the hubs 61 and 62 and extends therebetween through the central passageway 42. The valve stem 66 is of such length that only one of the valve faces 63 and 64 can sealingly contact its associated valve seat at one time. The valve stem has enlarged flat heads 67 and 68 at the ends thereof which in conjunction with the diaphragms 48 and 53 define surface areas capable of being acted upon by the fluid pressure within the chamber. It will be observed that because of the heads 67 and 68 greater surface areas face and are acted upon by fluid pressure in chambers 49 and 56 than face chambers 51 and 54.

Operation

It will be apparent that with the valve stem 66 in the position shown in the figure, groove 32 will communicate through passage 46, passageway 42, chamber 54 and passage 69 with the groove 33 and, therefore, passages 22 and 23 will be in communication with each other. If the valve stem is moved leftwardly to close valve face 64 against valve seat 44 and open valve face 63 from valve seat 43, passage 22 will be in communication with conduit 18, through passage 46, passageway 42, groove 32 and chambers 49 and 51.

While the valve may be used with positive pressure or vacuum pressure sources, the following description of its operation will be made with respect to positive pressure supplies in both the conduits 18 and 19. Further, while it will be apparent that the conduit 18 and the passages 22 and 23 can be connected to a pressure source, to a load and to exhaust in a variety of ways, the following description of operation will proceed for convenience on the basis that conduit 18 is connected to the pressure source, passage 22 is connected to the load and conduit 23 is connected to exhaust.

Referring to the type of operation in which conduits 18 and 19 are both connected to positive pressure sources, fluid pressure conduit 18 will pass into chamber 49 and through the perforations in diaphragm 48 into the chamber 51. Because of the greater surface area on the leftward side of the diaphragm 48 as appearing in the figure, due to the flat head 67 on the valve stem 66, the fluid pressure in conduit 18 will exert a greater force urging the valve stem rightwardly as appearing in the figure and, therefore, valve face 63 will be moved into engagement with valve seat 43. Thus, the valve will normally be in the position shown in the figure wherein passages 22 and 23 are in communication with each other. Pulses of positive fluid pressure in conduit 19 will act on the diaphragm 53 and move the valve stem 66 leftwardly as appearing in the figure. Such will result in placing conduit 18 in communication with the passage 22. Thus, pressure fluid will flow from the conduit 18 into the passage 22 to actuate the load. As soon as pressure fluid in conduit 19 is relieved, the valve will automatically shift into the position shown in the figure and passage 22 will be restored to its connection with the passage 23. Thus, the valve is normally in the position shown in the figure and will be moved out of such position only when a pressure pulse appears in conduit 19.

If conduits 18 and 19 are connected to steady and pulsating vacuum sources, respectively, the valve stem 66 will normally be positioned opposite to the position shown in the figure and passage 22 will normally communicate with conduit 18. Pulses of vacuum in conduit 19 will shift the valve stem 66 to the position shown in the figure and passage 22 will communicate with passage 23.

It will be observed that the valve 26 is a completely self-contained unit and does not need to be especially aligned with either the conduits 18 and 19 or the passages 22 and 23. Thus, if it should become necessary or desirable to replace the valve, same can easily be done merely by removing one of the end plates 12 and 13 and sliding the valve axially out of said opening and then sliding a new valve into an opening 21. No special alignment or fastening of the valve to the casing 11 is required.

While a particular preferred embodiment of the invention has been described above, the invention contemplates such changes or modifications therein as lie within the scope of the appended claim.

What is claimed is:

A valve construction, comprising: a valve casing having a cylindrical opening therein and having a pair of fluid pressure conduits communicating with said opening at the ends thereof, said casing also having a pair of axially spaced passages communicating with said opening through the side wall thereof; a valve housing slidably received within said opening, said housing having three radially outwardly extending circumferential flanges defining two axially spaced grooves in said housing, said grooves being in registry with said passages, respectively; a circumferentially extending recess in each of said flanges and an O-ring in each of said recesses and sealingly contacting the side wall of said opening to isolate said grooves from each other; said valve housing having a longitudinally extending central passageway therethrough and having a pair of enlarged chambers at the ends thereof, said conduits communicating with said chambers; means defining a valve seat between each chamber and the adjacent end of said passageway; a first, imperforate, flexible diaphragm mounted on said housing and located within and extending transversely across one of said chambers to divide said one chamber into a pair of noncommunicating portions, the adjacent conduit communicating with the portion of said one chamber remote from the adjacent valve seat; a second, perforate, flexible diaphragm mounted on said housing and located within and extending transversely across the other of said chambers, said diaphragms each having a valve element thereon sealingly engageable with the valve seat adjacent thereto; a valve rod connected to said diaphragms and extending through said passageway and movable between positions where one or the other of said valve elements sealingly engages its associated valve seat; said housing having a first port extending between one of said grooves and said one chamber at the portion thereof adjacent said valve seat; said valve housing having a second port axially spaced from said first port and extending radially between said passageway and the other of said grooves.

References Cited in the file of this patent

UNITED STATES PATENTS

| | | |
|---|---|---|
| 620,204 | Wilkins | Feb. 28, 1899 |
| 1,679,614 | Lichtenberg | Aug. 7, 1928 |
| 1,921,092 | Newton | Aug. 8, 1933 |
| 2,019,766 | Peterson | Nov. 5, 1935 |
| 2,180,320 | Hansen | Nov. 14, 1939 |
| 2,537,308 | Hansen | Jan. 9, 1951 |
| 2,658,523 | Johnson | Nov. 10, 1953 |
| 2,747,801 | Frey | May 29, 1956 |
| 2,768,791 | Frey | Oct. 30, 1956 |
| 2,795,239 | Eckman | June 11, 1957 |
| 2,875,784 | Cole | Mar. 3, 1959 |
| 2,912,009 | Cooksley | Nov. 10, 1959 |